(12) United States Patent
Larsson

(10) Patent No.: US 8,391,379 B2
(45) Date of Patent: Mar. 5, 2013

(54) OFDM SIGNAL SPECTRUM SHAPING DEVICE AND METHOD FOR OFDM SIGNAL SPECTRUM SHAPING

(75) Inventor: Torbjorn A. Larsson, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 675 days.

(21) Appl. No.: 12/322,204

(22) Filed: Jan. 30, 2009

(65) Prior Publication Data
US 2009/0168844 A1 Jul. 2, 2009

Related U.S. Application Data

(63) Continuation of application No. 10/960,430, filed on Oct. 6, 2004, now Pat. No. 7,505,522.

(60) Provisional application No. 60/508,994, filed on Oct. 6, 2003, provisional application No. 60/548,547, filed on Feb. 27, 2004.

(51) Int. Cl.
*H04L 27/28* (2006.01)

(52) U.S. Cl. ........ 375/260; 375/132; 375/259; 375/285; 375/295; 375/296

(58) Field of Classification Search ................ 375/132, 375/260, 259, 285, 295, 296
See application file for complete search history.

(56) References Cited

U.S. PATENT DOCUMENTS

| | | | |
|---|---|---|---|
| 4,015,088 A | 3/1977 | Dubnowski et al. | |
| 4,959,865 A | 9/1990 | Stettiner et al. | |
| 5,029,184 A | 7/1991 | Andren et al. | |
| 5,271,038 A | 12/1993 | Cai | |
| 5,459,760 A * | 10/1995 | Watanabe | 375/134 |
| 5,548,582 A | 8/1996 | Brajal et al. | |
| 5,852,630 A | 12/1998 | Langberg et al. | |
| 5,974,082 A | 10/1999 | Ishikawa et al. | |
| 6,125,103 A | 9/2000 | Bauml et al. | |
| 6,175,551 B1 | 1/2001 | Awater et al. | |
| 6,563,881 B1 | 5/2003 | Sakoda et al. | |
| 6,574,283 B1 | 6/2003 | Sakoda et al. | |
| 6,584,106 B1 | 6/2003 | Merchant et al. | |
| 6,587,526 B1 | 7/2003 | Li et al. | |
| 6,650,616 B2 * | 11/2003 | Crawford | 370/203 |
| 6,657,949 B1 | 12/2003 | Jones, IV et al. | |
| 6,687,307 B1 | 2/2004 | Anikhindi et al. | |
| 6,728,294 B1 | 4/2004 | Kohno et al. | |
| 6,807,145 B1 | 10/2004 | Weerackody et al. | |
| 6,912,262 B1 | 6/2005 | Chini et al. | |
| 7,170,884 B1 | 1/2007 | Radimirsch et al. | |
| 7,177,297 B2 | 2/2007 | Agrawal et al. | |
| 7,184,719 B2 | 2/2007 | Roberts | |
| 7,206,317 B2 | 4/2007 | Cimini, Jr. et al. | |
| 7,269,200 B2 | 9/2007 | Igarashi | |
| 7,327,793 B2 * | 2/2008 | Jin | 375/260 |
| 7,336,716 B2 * | 2/2008 | Maltsev et al. | 375/260 |
| 7,340,006 B2 * | 3/2008 | Yun et al. | 375/296 |

(Continued)

OTHER PUBLICATIONS

"U.S. Appl. No. 10/960,430, Non Final Office Action mailed Apr. 1, 2008", 15 pgs.
"U.S. Appl. No. 10/960,430, Non Final Office Action mailed Sep. 19, 2007", 13 pgs.
"U.S. Appl. No. 10/960,430, Notice of Allowance mailed Nov. 5, 2008", 9 pgs.

(Continued)

*Primary Examiner* — Siu Lee
(74) *Attorney, Agent, or Firm* — Schwegman, Lundberg Woessner, P.A.

(57) ABSTRACT

An orthogonal frequency division multiplexing (OFDM) signal spectrum shaping device comprises an input interface configured to receive an input signal, a modulation portion coupled to the input interface, configured to modulate the input signal to generate a plurality of uncompensated sub-carriers, and a sub-carrier gain control module configured to selectively apply a plurality of gain factors to the plurality of uncompensated sub-carriers to generate a plurality of compensated sub-carriers that are substantially equal in amplitude.

21 Claims, 11 Drawing Sheets

U.S. PATENT DOCUMENTS

| | | |
|---|---|---|
| 7,460,876 B2 | 12/2008 | Sadri et al. |
| 2002/0027875 A1 | 3/2002 | Sudo et al. |
| 2002/0044014 A1* | 4/2002 | Wright et al. ............ 330/2 |
| 2002/0122499 A1* | 9/2002 | Kannan et al. ............ 375/260 |
| 2003/0142754 A1 | 7/2003 | Jung et al. |
| 2003/0189917 A1* | 10/2003 | Sudo ............ 370/347 |
| 2003/0202460 A1 | 10/2003 | Jung et al. |
| 2004/0252781 A1 | 12/2004 | Park |
| 2005/0078598 A1 | 4/2005 | Batra et al. |
| 2005/0105594 A1 | 5/2005 | Giannakis et al. |
| 2005/0254587 A1* | 11/2005 | Kim et al. ............ 375/260 |
| 2007/0098109 A1 | 5/2007 | Vadde et al. |
| 2007/0217546 A1 | 9/2007 | Sandell et al. |

OTHER PUBLICATIONS

"U.S. Appl. No. 10/960,430, Response filed Jul. 7, 2008 to Non Final Office Action mailed Apr. 1, 2008", 10 pgs.

"U.S. Appl. No. 10/960,430, Response filed Dec. 26, 2007 to Non Final Office Action mailed Sep. 19, 2007", 9 pgs.

"Multi-Band OFDM Physical Layer Proposal", IEEE P802.15-03/267r2, (Jul. 2003).

"Multi-Band OFDM Physical Layer Proposal for IEEE 802.15", IEEE P802.15-03/268r1, (Apr. 2005), 70 pgs.

"TI PhysicalLayer Proposal for IEEE 802.15, Task Group 3a", IEEE P802.15-03/142r1, (May 2003), 76 pgs.

* cited by examiner

OFDM SIGNAL SPECTRUM SHAPING DEVICE AND METHOD FOR OFDM SIGNAL SPECTRUM SHAPING

CROSS REFERENCE TO OTHER APPLICATIONS

This application is a continuation of U.S. patent application Ser. No. 10/960,430, entitled SPECTRAL SHAPING IN MULTIBAND OFDM TRANSMITTER WITH CLIPPING filed Oct. 6, 2004, now issued as U.S. Pat. No. 7,505,522, which is incorporated herein by reference for all purposes, which claims priority to U.S. Provisional Application No. 60/508,994, entitled METHOD FOR SPECTRAL SHAPING NN MULTIBAND OFDM TRANSMITTERS filed Oct. 6, 2003, which is incorporated herein by reference for all purposes, and U.S. Provisional Application No. 60/548,547, entitled SPECTRAL SHAPING FOR MULTIBAND OFDM TRANSMITTERS filed Feb. 27, 2004, which is incorporated herein by reference for all purposes.

BACKGROUND OF THE INVENTION

Multiband orthogonal frequency division multiplexing (MB-OFDM) is a modulation technique used in some wireless communication systems such as ultra-wideband (UWB). The MB-OFDM modulation technique combines OFDM modulation with frequency hopping. It is a modulation technique suitable for devices designed to comply with Federal Communications Commission (FCC) regulations relating to UWB devices.

Unlike most other wireless systems in which the transmit power limit is typically set with respect to the total power integrated over the entire signal band, UWB devices are allowed to operate within a relatively wide frequency band provided that two criteria are met. First, the occupied bandwidth is required to meet a predefined minimum. Second, the radiated power measured over an integrating bandwidth anywhere within the signal band is required to be less than a predefined maximum. According to the current regulations, UWB devices are allowed to operate in the frequency band between 3.1 to 10.6 GHz. The occupied bandwidth is required to meet a minimum of 500 MHz and the radiated power, when measured over a bandwidth of 1 MHz anywhere within the signal band, is required to be less than −41.3 dBm.

Since in UWB the integrating bandwidth (1 MHz) is much smaller than the bandwidth of the UWB signal itself (500 MHz), the shape of the spectrum is an important issue. In order to maximize the output power of a MB-OFDM transmitter, the spectrum of the generated signal should be made as flat as possible. FIG. 1A is a diagram illustrating a frequency spectrum of an ideal UWB signal. In practice, factors such as D/A converter pulse shape, non-ideal filter characteristics, component variations and data characteristics tend to affect the shape of the spectrum. FIG. 1B is a diagram illustrating the frequency spectrum of a typical UWB signal generated by an existing device. There are peaks and variations in the frequency spectrum. The transmit power is typically limited by the largest peak in the signal spectrum. It would be desirable to have a UWB MB-OFDM transmitter design that would generate a flat output spectrum over the operating frequency range of the transmitter.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Spectrum shaping techniques for transmitting OFDM signals are disclosed. In some embodiments, a band gain control is used to determine a band gain for a selected band associated with the signal to be transmitted. In some embodiments, a sub-carrier amplitude control is used to apply a gain factor to each of the sub-carrier frequency components of the modulated signal. In some embodiments, modified synchronization sequences are used to reduce peaks in the frequency spectrum. In some embodiments, a random phase shifter introduces random or pseudorandom phase shifts to the signal to reduce repetitive patterns in the signal and achieve flatter frequency spectrum. Combinations of these techniques can be used in various embodiments. For purposes of illustration, spectrum shaping of frequency hopping OFDM signals is discussed in detail below.

Figure 1A:
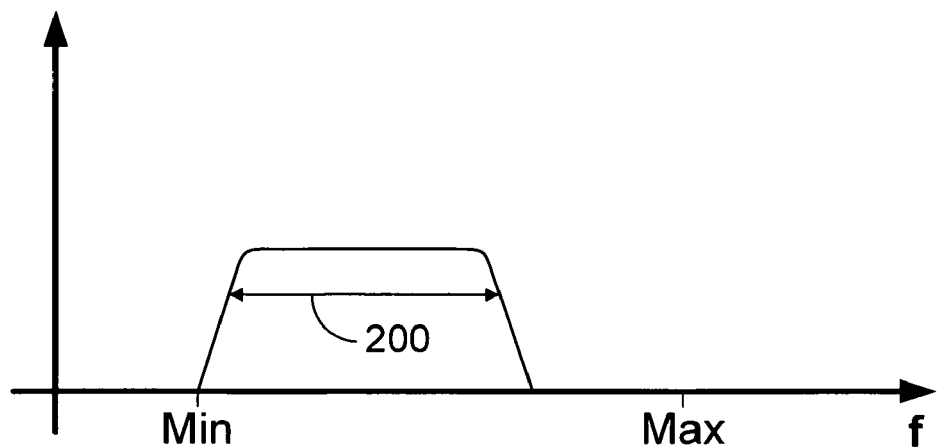
FIG. 1A is a diagram illustrating a frequency spectrum of an ideal UWB signal.
Figure 1B:
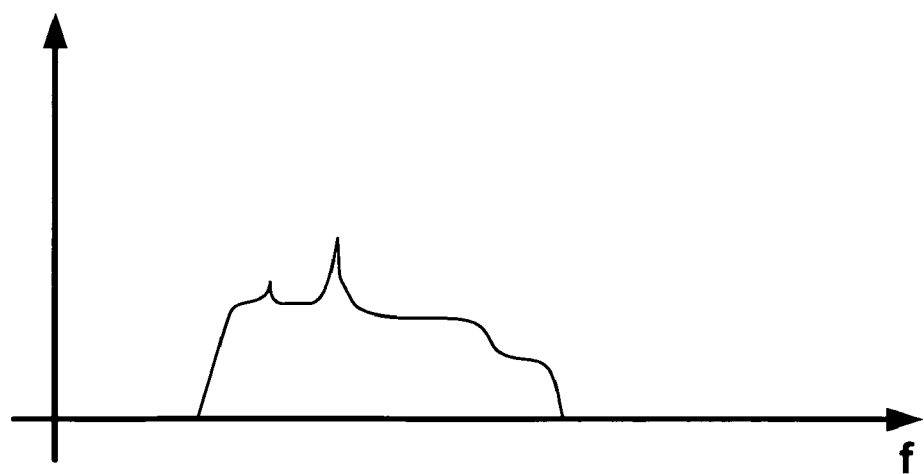
FIG. 1B is a diagram illustrating the frequency spectrum of a typical UWB signal generated by an existing device.
Figure 1C:
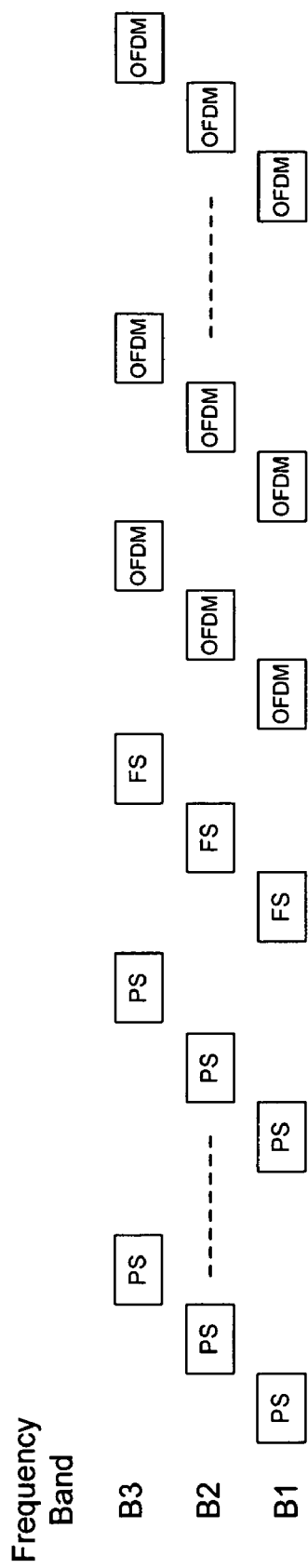
FIG. 1C is a diagram illustrating the transmission of an OFDM packet using multiple frequency hopping bands.

In some MB-OFDM systems, multiple frequency hopping bands (also referred to as hop bands or transmission bands) are used to transmit OFDM symbols to avoid symbol collision. An OFDM symbol waveform includes a number of modulated carrier waveforms, referred to as sub-carriers. Each sub-carrier is used to carry one data symbol, encoded as a phase shift or a combination of amplitude shift and phase shift. In some embodiments, the sub-carrier frequency spacing is approximately equal to the inverse of the OFDM symbol duration, which means that the sub-carrier waveforms partly overlap in the frequency domain. FIG. 1C is a diagram illustrating the transmission of an OFDM packet using multiple frequency hopping bands. In the example shown, each rectangle corresponds to a synchronization symbol or an OFDM symbol. The initial part of the packet, referred to as the synchronization preamble, includes a sequence of identical packet synchronization (PS) symbols, followed by a small number of frame synchronization (FS) symbols. The synchronization symbols are used to aid the receiver in synchronizing to the received signal. In the example shown, the synchronization symbols, which are not OFDM-modulated, include a specific sequence of binary phase shift keying (BPSK) symbols known as the synchronization sequence. The PS and FS symbols are identical except for a phase shift of 180°, making them easily distinguishable to the receiver. Detecting the location of the FS symbols allows the receiver to determine the boundary between the synchronization preamble and the OFDM-modulated portion of the packet.

Figure 2A:
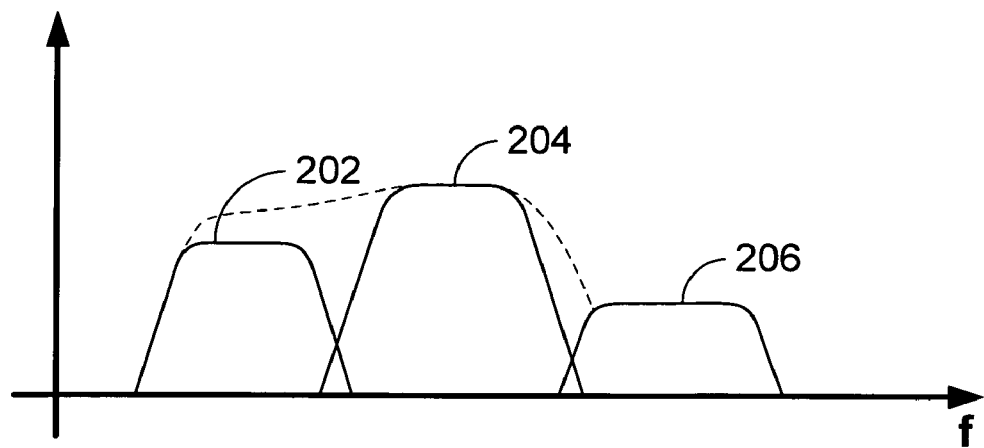
FIG. 2A is a diagram illustrating the frequency spectrum of three hop bands generated by some transmitter embodiments.

For the purpose of illustration, three frequency hopping bands are used in the examples below, although any number of frequency hopping bands may be used as appropriate. FIG. 2A is a diagram illustrating the frequency spectrum of three hop bands generated by some transmitter embodiments. In this example, the frequency spectrum that includes hop bands 202, 204 and 206 is uneven. The unevenness of the frequency spectrum is sometimes due to component gain difference (i.e. the gain difference introduced by transmitter components such as mixers, amplifiers, filters and the antenna). Variations in the manufacturing process and changes in the operating environment are some additional factors that may contribute to the gain difference.

Figure 2B:
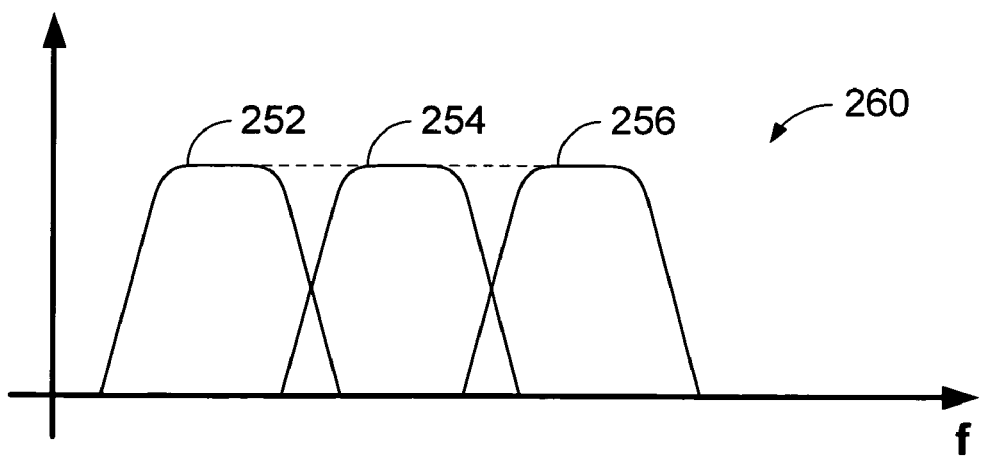
FIG. 2B is a diagram illustrating the frequency spectrum of three hop bands generated by a transmitter embodiment that compensates the effects shown in FIG. 2A.

FIG. 2B is a diagram illustrating the frequency spectrum of three hop bands generated by a transmitter embodiment that compensates the effects shown in FIG. 2A. In this example, frequency hopping bands 252, 254 and 256 each has a corresponding band gain used to compensate and adjust the signal strength to achieve a relatively flat frequency spectrum 260. The adjustment is made by determining the frequency hopping band associated with the signal to be transmitted, determining the band gain that corresponds to the frequency hopping band and applying the band gain to the signal. The band gains are determined during the design process of the transmitter in some embodiments to correct any systematic gain deviations for different hop bands. In some embodiments, an uncompensated output signal is measured to supply feedback information used to determine the band gain values and achieve the desired frequency spectrum characteristics. The feedback technique can be used during the manufacturing process, during the transmission operations of the transmitter or both.

Figure 3:
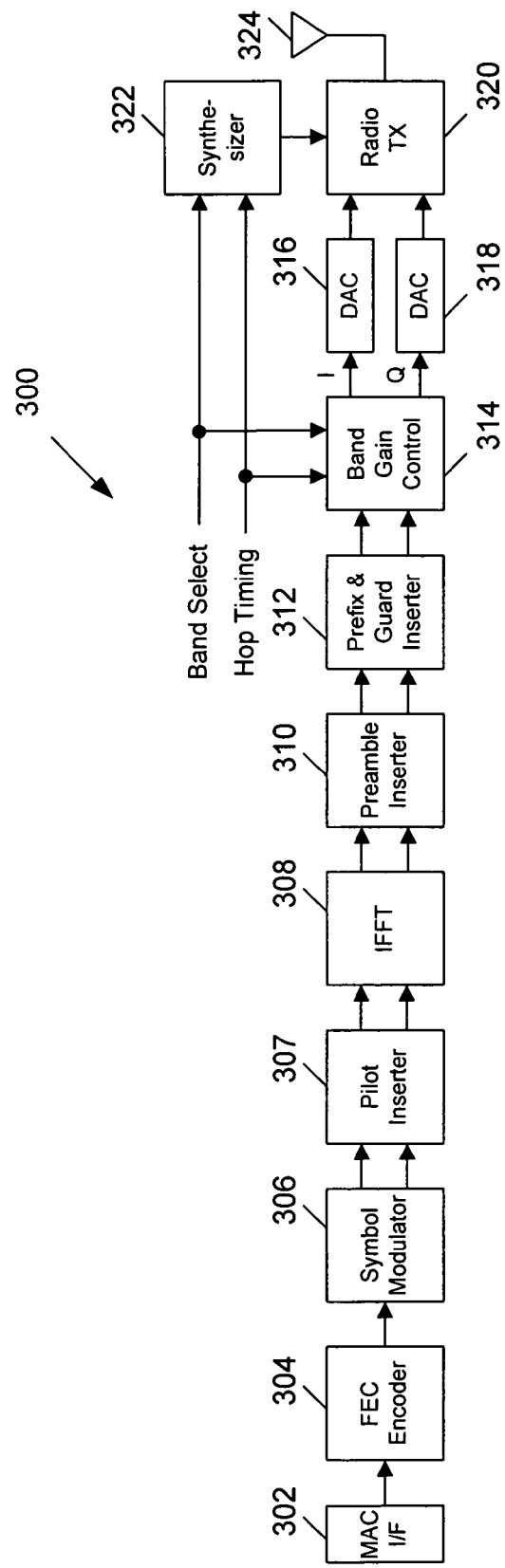
FIG. 3 is a block diagram illustrating an OFDM transmitter embodiment.

FIG. 3 is a block diagram illustrating an OFDM transmitter embodiment. In this example, transmitter 300 outputs a signal with a gain compensated frequency spectrum similar to 260. Data bits are received on medium access control (MAC) interface 302 and then encoded by a forward error correction (FEC) encoder 304. In some embodiments, the encoded bits are optionally punctured, interleaved and repeated to provide better protection against multipath and interference. The bits are then mapped to modulation symbols by a symbol modulator 306. Quadrature Phase Shift Keying (QPSK) or other appropriate modulation scheme may be used. The modulated symbols such as QPSK symbols are also referred to as sub-carriers. Optionally, pilot tone inserter 306 adds pilot tones to the modulated symbols. An inverse Fast Fourier Transform (IFFT) component 308 is used to transform blocks of symbols from frequency domain into a time domain waveform (also referred to as an OFDM symbol). A synchronization preamble that includes repeated PS and FS synchronization symbols is added to the beginning portion of each data packet by preamble inserter 310. A guard interval and a cyclic prefix or zero prefix are added to the OFDM symbol by prefix and guard inserter 312.

In this example, band gain control 314 applies a time varying band gain factor on its input to counter the effects of gain variations in different hop bands to achieve a more uniform frequency spectrum. Depending on the value of the gain factor that is applied, the signal becomes amplified, attenuated or unchanged as appropriate. Band gain control 314 is controlled by a hop timing signal and a band select signal. Gain values that correspond to different hop bands are stored in a lookup table or other appropriate storage. The hop timing signal determines when the band gain factor should change according to the timing of the OFDM symbol generation. The band select signal determines the value of the band gain factor used for a given hop band. In some embodiments, signal strength is measured during operation and an appropriate gain is determined according to the measurement.

The inphase (I) and quadrature (Q) components of the gain compensated baseband OFDM signal are converted from digital to analog by digital to analog converters (DACs) 316 and 318, respectively. The analog signals are sent to a radio transmitter 320 to be up-converted to the desired carrier frequency, amplified and then transmitted via antenna 324. The local oscillator (LO) signal used by radio 320 is generated by frequency synthesizer 322, which is also controlled by the control signals. Frequency synthesizer 322 has the ability to switch its output frequency at the start of each OFDM symbol period so that different transmitted OFDM symbols may occupy different hop bands. In some cases, the LO frequency is switched every symbol period. In other cases, the LO frequency remains the same for several symbol periods before it is switched again. The timing of the frequency switch is controlled by the hop timing signal. The appropriate LO frequency to be synthesized for a given symbol period is determined by the band select signal.

Figure 4A:
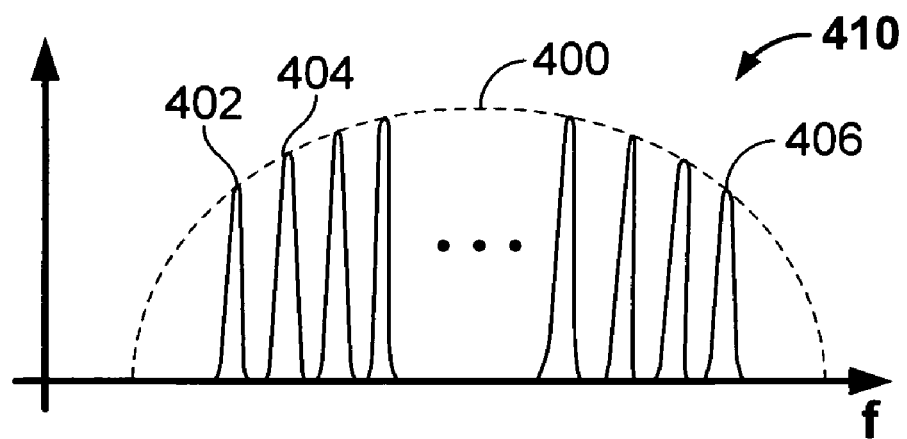
FIG. 4A is a diagram illustrating a frequency spectrum of a set of uncompensated sub-carriers within a frequency hopping band.

Variations in frequency spectrum exist among frequency hopping bands as well as among sub-carriers. FIG. 4A is a diagram illustrating a frequency spectrum of a set of uncompensated sub-carriers within a frequency hopping band. Ideally, the sub-carriers should have equal amplitude and form a flat frequency envelope. In practice, uncompensated sub-carriers such as 402, 404 and 406 have different amplitudes and form a frequency envelope 400 with amplitude variations. In the diagram shown, the signal amplitudes near the edges of the envelope are significantly weaker than those near the center of the envelope. The amplitude variations are partly attributed to the transmitter's DACs, which introduce a sin (x)/x shaping of the signal spectrum and cause the reduction in signal amplitude near the band edges. The various filters in the transmitter's signal path have a similar effect as the DAC. In some embodiments, these filters also cause a ripple in the signal spectrum.

Figure 4B:
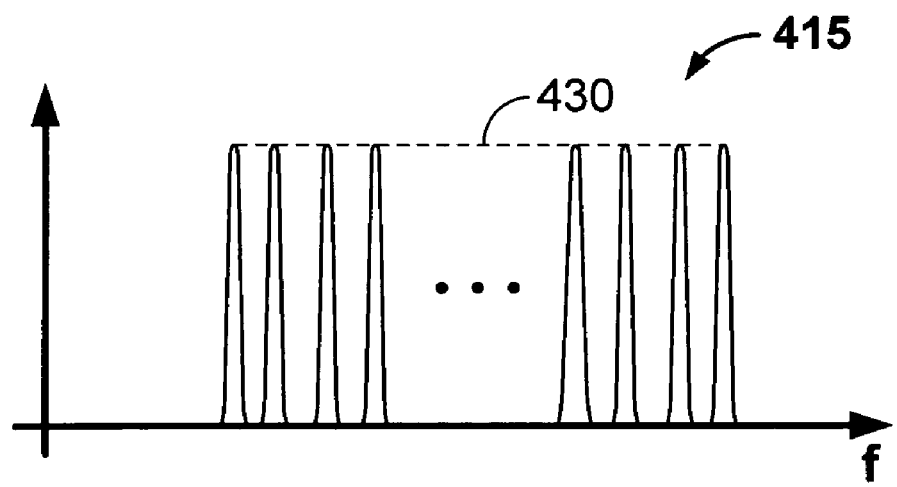
FIG. 4B is a diagram illustrating the frequency spectrum of the sub-carriers after the gain factors are applied.

In some embodiments, the effects of the DACs, the filters as well as other components are offset using gain compensation. A plurality of sub-carrier gain factors are applied to the uncompensated sub-carriers to make the amplitudes of the resulting gain compensated sub-carrier approximately equal. Depending on the value of the gain factor used, the corresponding uncompensated sub-carrier amplitude may be amplified, attenuated or unchanged. FIG. 4B is a diagram illustrating the frequency spectrum of the sub-carriers after the gain factors are applied. Each sub-carrier is multiplied with an appropriate sub-carrier gain factor. The values of the gain factors are selected such that when multiplied with corresponding sub-carriers in signal 415, the resulting compensated sub-carriers have approximately the same amplitude. For example, the sub-carriers near the band edges receive greater gain boost than the sub-carriers near the band center. The resulting sub-carrier envelope 430 is substantially more even compared to 406. In some embodiments, the amplitudes of uncompensated sub-carrier frequency components are measured to supply feedback information used to determine the sub-carrier gain factors. The measurement may take place during the manufacturing process, during the transmission operations of the transmitter or both.

Figure 5:
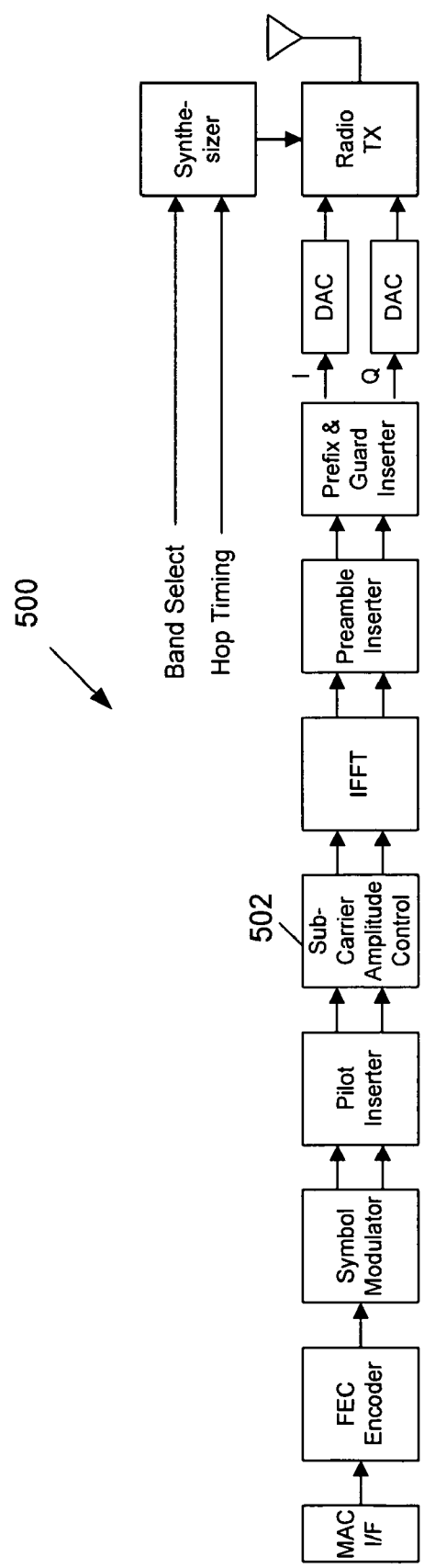
FIG. 5 is a block diagram illustrating an OFDM transmitter embodiment that adjusts the sub-carrier amplitudes.

FIG. 5 is a block diagram illustrating an OFDM transmitter embodiment that adjusts the sub-carrier amplitudes. In this example, like components of transmitter 500 and transmitter 300 perform like functions. Transmitter 500 additionally includes a sub-carrier gain control 502 that adjusts the amplitudes of the sub-carriers by applying appropriate gain factors to the corresponding sub-carriers. In some embodiments, a different set of gain factors is used for each frequency hopping band. During transmission, the frequency hopping band associated with the signal is determined and the appropriate set of gain factors is selected and applied. The application of the gain factors compensates the spectral distortion introduced by the DACs and various filters in the transmit signal path. A substantially flat baseband signal similar to signal 430 is thus obtained.

Figure 6A:
FIG. 6A is a diagram illustrating the frequency spectrum of a signal.
Figure 6B:
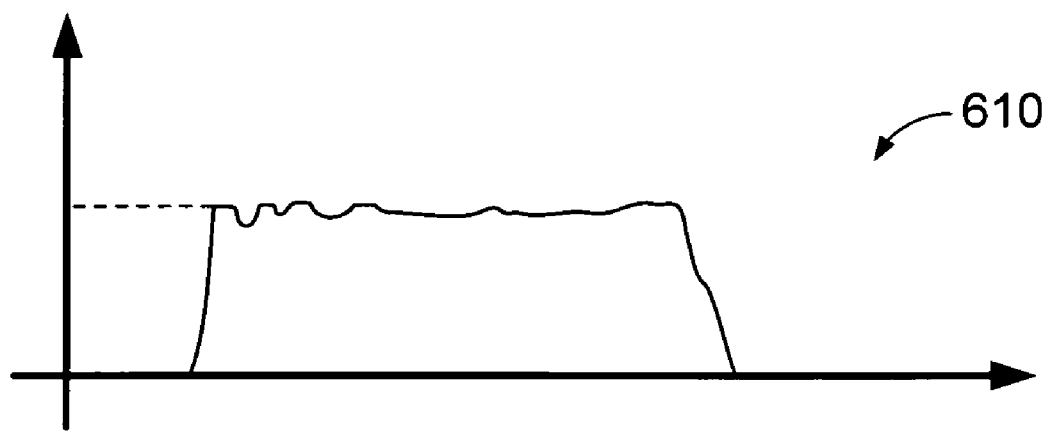
FIG. 6B is a diagram illustrating the clipped frequency spectrum.

The synchronization sequences are often chosen for their autocorrelation and cross correlation properties rather than their spectral properties. As a result, the synchronization data sequence sometimes introduces peaks in the frequency spectrum, making the frequency spectrum substantially non-flat. FIG. 6A is a diagram illustrating the frequency spectrum of a signal. In this example, the signal includes several peaks (such as peak 602) in its frequency spectrum. In some embodiments, the signal is clipped at a level 604 to create a frequency spectrum that is more even. FIG. 6B is a diagram illustrating the clipped frequency spectrum. Details of the clipping process are discussed below.

Figure 7:
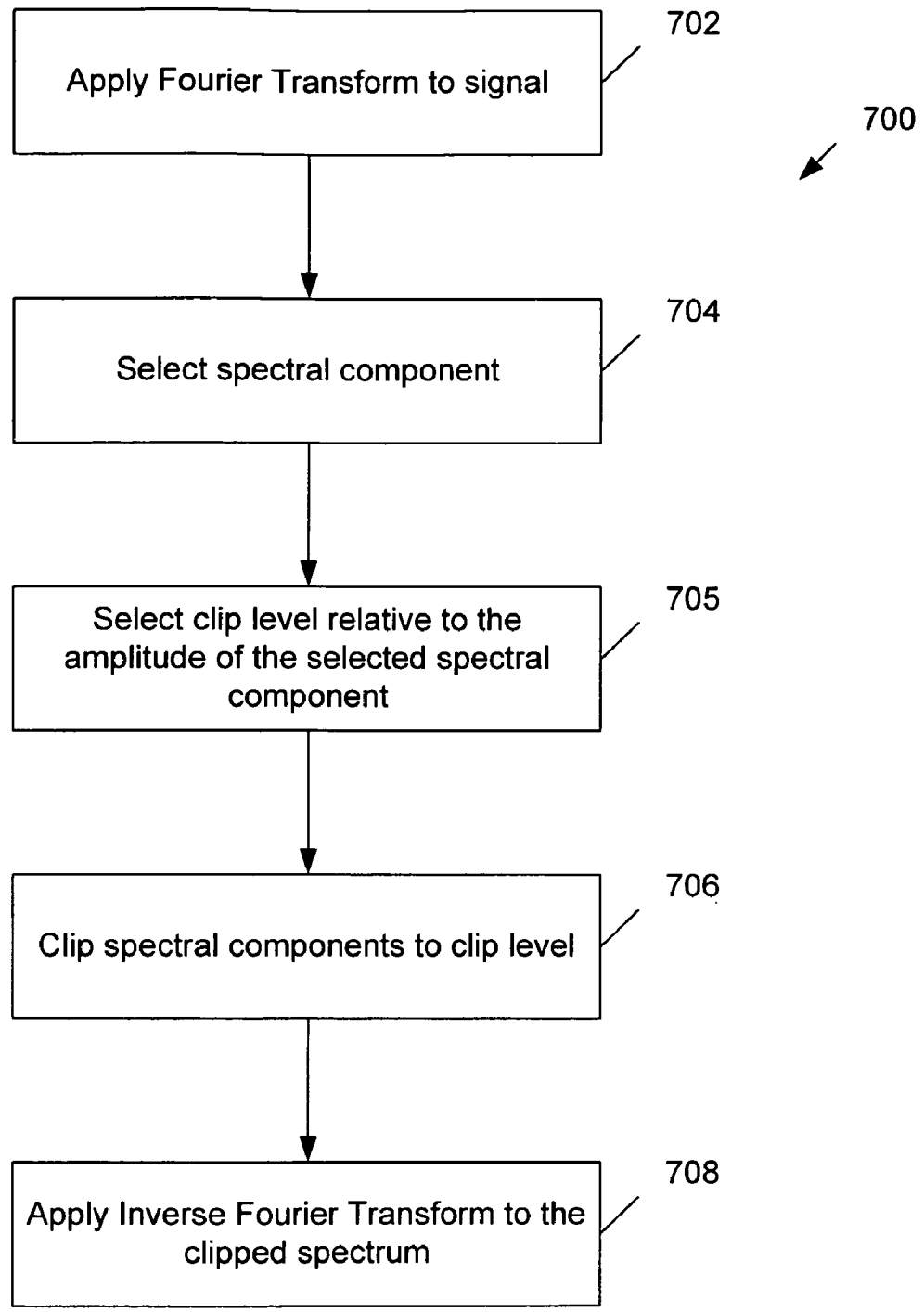
FIG. 7 is a flowchart illustrating a frequency clipping process according to some embodiments.

FIG. 7 is a flowchart illustrating a frequency clipping process according to some embodiments. During process 700, frequency components of an input are limited to a predetermined clip level in order to reduce or eliminate the peaks and achieve a flat frequency spectrum. The original data sequence is first Fourier transformed to obtain its complex-valued spectral representation (702). A spectral component is then selected (704). In this example, the spectral component (also referred to as the Fourier coefficient) with the maximum amplitude is chosen. Next, the clip level is selected (705). The clip level, which controls the flatness of the generated signal spectrum, is chosen relative to the selected spectral amplitude in some embodiments. The amplitudes of the spectral components are then clipped according to the clip level (706). In other words, spectral components with amplitude exceeding the clip level are given a new amplitude value equal to the clip level. Other spectral components with amplitudes less than or equal to the clip level are unchanged. Finally, an inverse Fourier transform is applied to the clipped spectrum to transform the signal back to the time domain (708).

The clipping operation can affect the auto-correlation and cross-correlation properties of the synchronization sequence. In some embodiments, a moderate clip level (for example, 3 dB below the maximum spectral amplitude) is chosen to achieve a substantial improvement of the spectral flatness with only a small impact on the performance of the receiver. In some embodiments, the clip level is further reduced until all the spectral components in the modified synchronization sequence have approximately equal amplitude, thus creating a spectrum that is substantially flat. In some cases, the clip level is set to a value less than or equal to the smallest spectral amplitude. In some embodiments, several outputs generated by using different clip levels are compared to select an appropriate clip level that offers flat spectrum without significantly degrading the output sent to the receiver.

Figure 8:
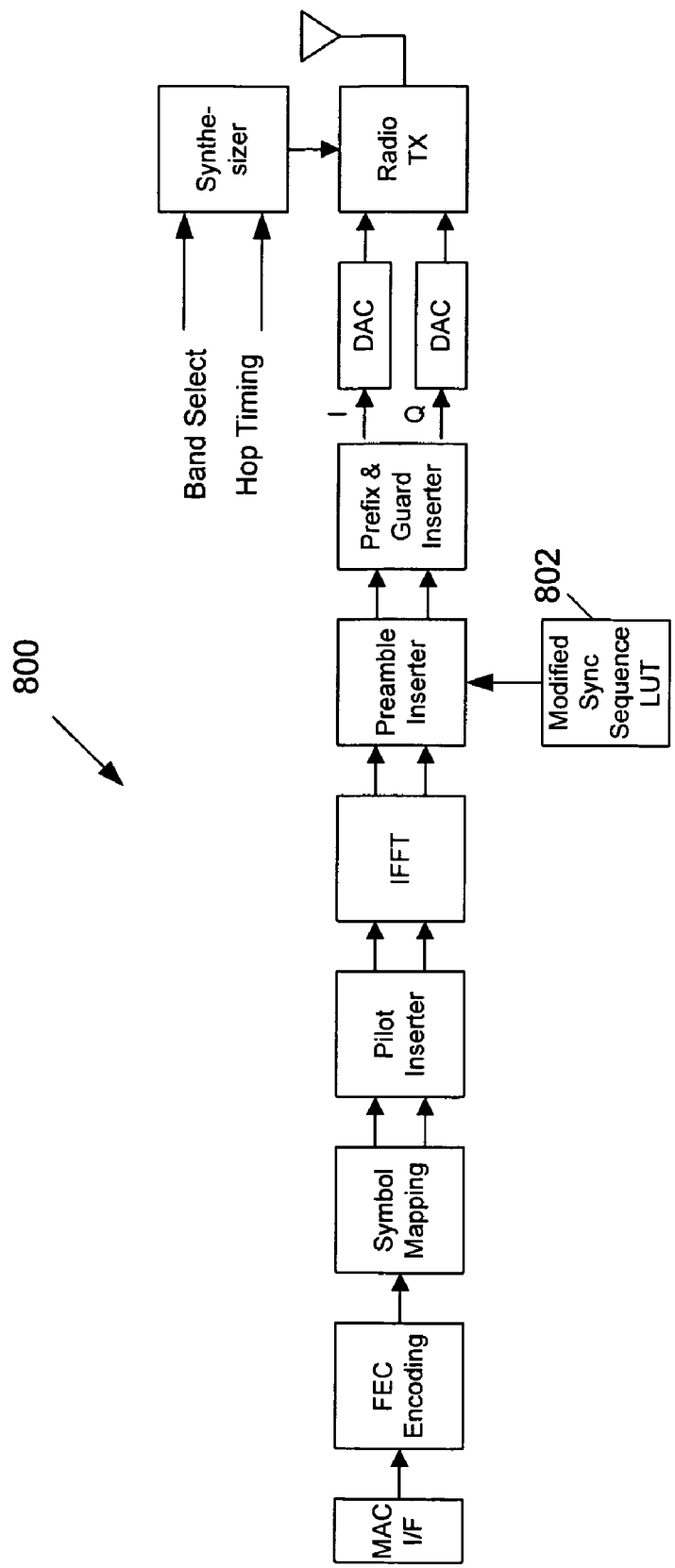
FIG. 8 is a block diagram illustrating another OFDM transmitter embodiment.

It is not necessary to perform the computations described in process 700 for each data sequence during transmission. In some embodiments, similar effects are achieved by using pre-computed, modified synchronization sequences that have reduced spectral peaks in the preamble waveform. One way to derive the modified synchronization sequences is to apply the computations of process 700 to different synchronization sequences and store the results. FIG. 8 is a block diagram illustrating another OFDM transmitter embodiment. Like components of transmitter 800 and transmitter 300 perform like functions. In this example, modified synchronization sequences are stored in a lookup table 802. When a preamble is to be generated, the modified synchronization sequence that corresponds to the preamble is retrieved and inserted into the signal stream. Other implementations are sometimes used in different embodiments. For example, the preambles can be inserted prior to the IFFT operation. The frequency domain components may be clipped and buffered before they are processed by the IFFT component.

In some embodiments, a random phase shifter that applies random or pseudorandom phase shifts to the OFDM symbols is used to randomize the signal and reduce peaks in the frequency spectrum. The amount of phase shift for each symbol may be determined according to a pseudo random sequence or other predefined sequence. If desired, the sequence of phase shifts can be reconstructed in the receiver, allowing the receiver remove the phase shift of each received OFDM symbol before other tasks such as channel estimation, phase estimation and data demodulation are carried out.

Figure 9:
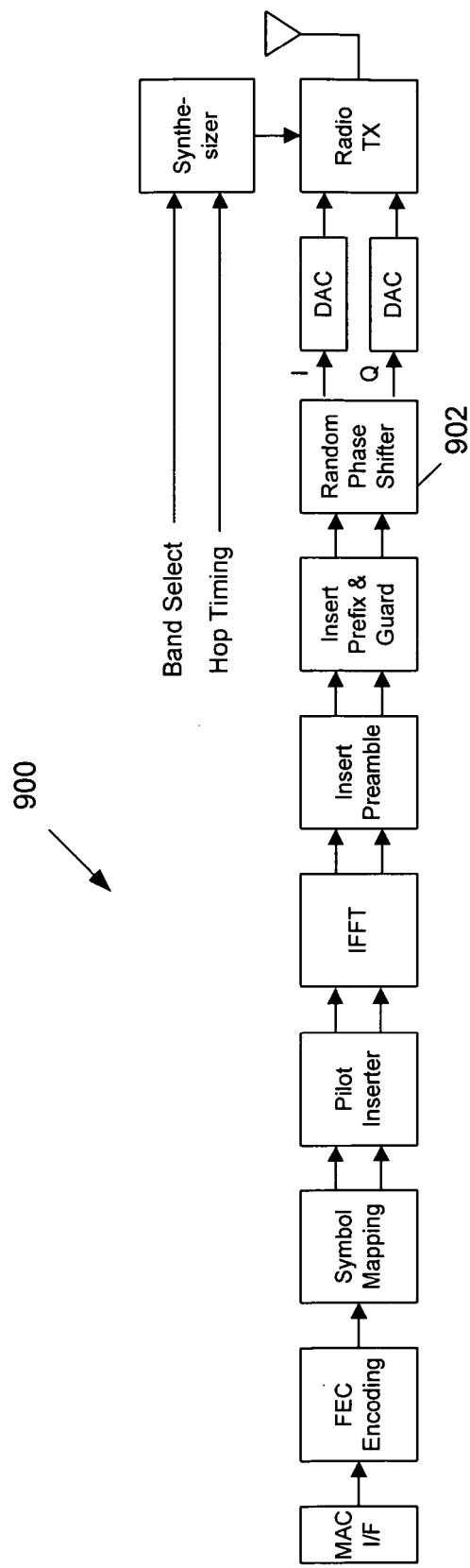
FIG. 9 is a block diagram illustrating another OFDM transmitter embodiment that implements the phase shift.

FIG. 9 is a block diagram illustrating another OFDM transmitter embodiment that implements the phase shift. In this example, a random phase shifter 902 is used to introduce random or pseudo random phase shifts to the OFDM symbols. In some embodiments, the phase shifts are limited to multiples of 90° (i.e. the phase shifts are restricted to 0°, 90°, 180°, 270°) so that the random phase shifter can be implemented via two basic operations: interchanging the I and Q signal components and reversing the sign of I and/or Q signal components. Although the random phase shift is shown to take place prior to analog to digital conversion in this example, the phase shift operation may also be performed elsewhere in the transmitter. For example, the phase of the QPSK symbols at the input of the IFFT may be shifted before the IFFT is applied.

Figure 10:
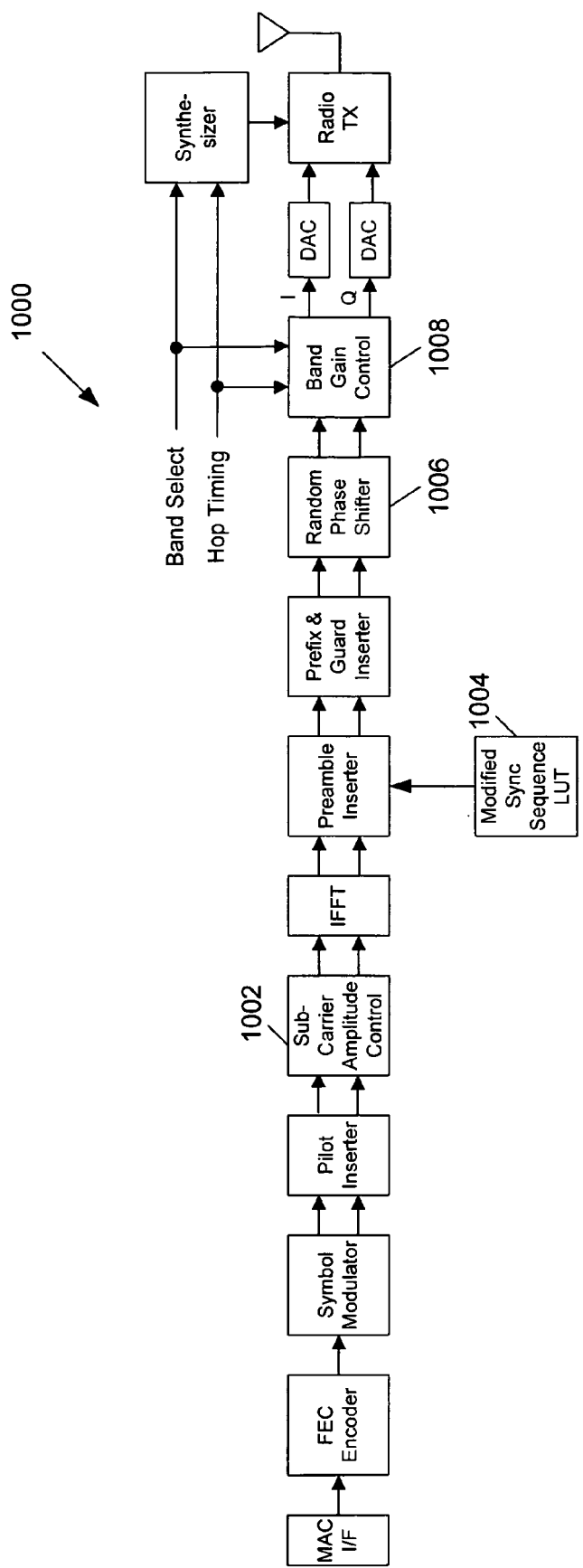
FIG. 10 is a diagram illustrating a transmitter embodiment that includes several spectrum shaping components.

The spectrum shaping techniques can be used in combination in some embodiments. For example, some transmitter embodiments include both a modified synchronization sequence lookup table for clipping preamble frequency spectrum and a random phase shifter for performing phase shift. Some transmitter embodiments use both a band gain control and a sub-carrier amplitude control. FIG. 10 is a diagram illustrating a transmitter embodiment that includes several spectrum shaping components. Transmitter 1000 shown in this example includes a sub-carrier amplitude control 1002, a modified synchronization sequence lookup table 1004, a random phase shifter 1006 and a band gain control 1008. One or more of these components may be active at the same time to shape the output signal to achieve a more uniform output spectrum.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An orthogonal frequency division multiplexing (OFDM) signal spectrum shaping device, comprising:
   an input interface configured to receive an input signal;
   a modulation portion coupled to the input interface, configured to modulate the input signal to generate a plurality of uncompensated sub-carriers; and
   a sub-carrier gain control module configured to apply a plurality of gain factors to the plurality of uncompensated sub-carriers to generate a plurality of compensated sub-carriers that are substantially equal in amplitude; wherein a different set of gain factors is used for each frequency hopping band.

2. The OFDM signal spectrum shaping device of claim 1, wherein the sub-carrier gain control module is configured to:
   apply a first gain factor to a first uncompensated sub-carrier to obtain a first compensated sub-carrier; and
   apply a second gain factor to a second uncompensated sub-carrier to obtain a second compensated sub-carrier, wherein the amplitude of the first compensated sub-carrier and the second compensated sub-carrier are substantially equal in amplitude.

3. The OFDM signal spectrum shaping device of claim 2, further comprising:
   an Inverse Fast Fourier Transform (IFFT) component configured to transform the plurality of sub-carriers to a time domain waveform; and
   a digital to analog converter (DAC) for converting at least a portion of the time domain waveform to an analog signal.

4. The OFDM signal spectrum shaping device of claim 3, further comprising a synthesizer configured to generate a local oscillator signal for modulating the analog signal to generate a modulated signal.

5. The OFDM signal spectrum shaping device of claim 4, wherein the synthesizer selectively varies frequency of the local oscillator signal over time so that the modulated signal is a frequency hopping signal that has varying frequency bands over time.

6. The OFDM signal spectrum shaping device of claim 4, wherein the synthesizer is controlled at least in part by a band selection signal for controlling the local oscillator signal's frequency band selection among a plurality of frequency bands.

7. The OFDM signal spectrum shaping device of claim 4, wherein the synthesizer is controlled at least in part by a hop timing signal for controlling timing of the local oscillator signal's frequency band selection among a plurality of frequency hop bands.

8. The OFDM signal spectrum shaping device of claim 4, further comprising a band gain control module that generates a time varying band gain factor applied to the modulated signal such that a resulting band gain adjusted modulated signal has time varying frequency bands that are substantially the same in amplitude.

9. The OFDM signal spectrum shaping device of claim 8, further comprising a transmitter radio for transmitting the band gain adjusted modulated signal.

10. The OFDM signal spectrum shaping device of claim 2, further comprising a preamble inserter for inserting a synchronization preamble to at least a portion of the time domain wave form.

11. A method for shaping an orthogonal frequency division multiplexing (OFDM) signal spectrum, comprising:
    receive an input signal;
    at an orthogonal frequency division multiplexing (OFDM) communications device, modulating the input signal and generating generate a plurality of uncompensated sub-carriers; and
    at the orthogonal frequency division multiplexing (OFDM) communications device, applying a plurality of gain factors to the plurality of uncompensated sub-carriers to generate a plurality of compensated sub-carriers that are substantially equal in amplitude; wherein a different set of gain factors is used for each frequency hopping band.

12. The method of claim 11, wherein applying the plurality of gain factors includes:
    applying a first gain factor to a first uncompensated sub-carrier to obtain a first compensated sub-carrier; and
    applying a second gain factor to a second uncompensated sub-carrier to obtain a second compensated sub-carrier, wherein the amplitude of the first compensated sub-carrier and the second compensated sub-carrier are substantially equal in amplitude.

13. The method of claim 12, further comprising:
    performing an Inverse Fast Fourier Transform (IFFT) to transform the plurality of sub-carriers to a time domain waveform; and
    converting at least a portion of the time domain waveform to an analog signal.

14. The method of claim 13, further comprising generating a local oscillator signal, and modulating the analog signal using the local oscillator signal to generate a modulated signal.

15. The method of claim 14, further comprising selectively varying frequency of the local oscillator signal over time so that the modulated signal is a frequency hopping signal that has varying frequency bands over time.

16. The method of claim 14, further comprising using a band selection signal to control at least in part the local oscillator signal's frequency band selection among a plurality of frequency bands.

17. The method of claim 14, further comprising using a hop timing signal to control at least in part timing of the local oscillator signal's frequency band selection among a plurality of frequency hop bands.

18. The method of claim 14, further comprising generating a time varying band gain factor, and applying the time varying band gain factor to the modulated signal such that a resulting band gain adjusted modulated signal has time varying frequency bands that are substantially the same in amplitude.

19. The method of claim 18, further comprising transmitting the band gain adjusted modulated signal.

20. The method of claim 12, further comprising inserting a synchronization preamble to at least a portion of the time domain wave form.

21. A multi-band (MB) orthogonal frequency division multiplexing (OFDM) (MB-OFDM) transmitter to operate in a plurality of different hop bands, the transmitter comprising:
modulation circuitry to generate a plurality of uncompensated sub-carriers that are modulated with input modulation symbols; and
spectrum shaping circuitry to apply a plurality of gain factors to the uncompensated sub-carriers to generate a plurality of compensated sub-carriers that are substantially equal in amplitude to counter effects of gain variations in the different hop bands; wherein a different set of gain factors is used for each of the different hop bands.

* * * * *

UNITED STATES PATENT AND TRADEMARK OFFICE
CERTIFICATE OF CORRECTION

PATENT NO.        : 8,391,379 B2
APPLICATION NO.   : 12/322204
DATED             : March 5, 2013
INVENTOR(S)       : Torbjorn A. Larsson It is certified that error appears in the above-identified patent and that said Letters Patent is hereby corrected as shown below:

On title page 2, in column 2, under "Other Publications", line 9, delete "PhysicalLayer" and insert --Physical Layer--, therefor In the Claims In column 8, line 34, in claim 11, before "a", delete "generate", therefor Signed and Sealed this
Twenty-sixth Day of November, 2013

Margaret A. Focarino
*Commissioner for Patents of the United States Patent and Trademark Office*